US012157660B2

(12) United States Patent
Algül et al.

(10) Patent No.: US 12,157,660 B2
(45) Date of Patent: Dec. 3, 2024

(54) BEVERAGE LINE CLEANING APPARATUS AND SYSTEM

(71) Applicant: PUBINNO INOVASYON ARGE PAZ. A.S., Istanbul (TR)

(72) Inventors: Yusuf Can Algül, Istanbul (TR); Ahmet Necdet Alpmen, Istanbul (TR)

( * ) Notice: Subject to any disclaimer, the term of this patent is extended or adjusted under 35 U.S.C. 154(b) by 0 days.

(21) Appl. No.: 17/758,044

(22) PCT Filed: Dec. 31, 2019

(86) PCT No.: PCT/TR2019/051263
§ 371 (c)(1),
(2) Date: Jun. 27, 2022

(87) PCT Pub. No.: WO2021/137775
PCT Pub. Date: Jul. 8, 2021

(65) Prior Publication Data
US 2023/0069295 A1 Mar. 2, 2023

(51) Int. Cl.
*B67D 1/07* (2006.01)
*B08B 9/032* (2006.01)

(52) U.S. Cl.
CPC .............. *B67D 1/07* (2013.01); *B08B 9/0325* (2013.01); *B67D 2001/075* (2013.01)

(58) Field of Classification Search
CPC .. B67D 1/07; B67D 2001/075; B08B 9/0325; B08B 9/02; B08B 9/027; B08B 9/0321
See application file for complete search history.

(56) References Cited

U.S. PATENT DOCUMENTS

| | | | | |
|---|---|---|---|---|
| 2006/0169715 A1 | 8/2006 | Emmendorfer et al. | | |
| 2013/0146109 A1* | 6/2013 | Cavilia | B67D 1/07 | 134/56 R |
| 2014/0166694 A1* | 6/2014 | Otto | B67D 1/0057 | 222/95 |
| 2019/0070643 A1* | 3/2019 | Wong | B08B 9/0325 | |

FOREIGN PATENT DOCUMENTS

| | | | |
|---|---|---|---|
| EP | 0487214 | A1 | 5/1992 |
| FR | 2354829 | A1 | 1/1978 |
| WO | 1995012543 | A1 | 5/1995 |
| WO | 2005087397 | A1 | 9/2005 |
| WO | 2008147201 | A2 | 12/2008 |
| WO | 2015018965 | A1 | 2/2015 |
| WO | 2018236758 | A1 | 12/2018 |
| WO | 2019081720 | A1 | 5/2019 |

OTHER PUBLICATIONS

International Preliminary Report on Patentability for corresponding PCT/TR2019/051263, dated May 6, 2022.
International Search Report for corresponding PCT/TR2019/051263, dated Oct. 6, 2021.
Written Opinion of the International Searching Authority for corresponding PCT/TR2019/051263, dated Oct. 6, 2021.

* cited by examiner

*Primary Examiner* — Vishal Pancholi
*Assistant Examiner* — Robert K Nichols, II
(74) *Attorney, Agent, or Firm* — Egbert, McDaniel & Swartz, PLLC

(57) ABSTRACT

Disclosed is an apparatus for beverage line cleaning that enables an easy and traceable cleaning process. The apparatus and system can optimize the cleaning process by dynamically monitoring and using remote connections in order to perform an effective cleaning process.

21 Claims, 4 Drawing Sheets

BEVERAGE LINE CLEANING APPARATUS AND SYSTEM

BACKGROUND

The beverage line such as draft beer lines used for the purpose of dispensing beverage need to be cleaned on a regular basis, for example every two weeks, in order to ensure that the beverage dispensed through the lines is not contaminated by bacteria, yeast and debris that builds up in the beverage lines over time. This contamination would lead to poor quality and sour taste of dispensed beverage.

Conventionally, beverage lines like draft beer lines are cleaned through manual effort, through the process of both flushing or soaking water and chemicals through the lines by trained personnel. This process requires: 1) The manual filling and flushing of the correct quantity of water from a water tank, 2) The dosing and mixing of chemicals in the water tank so the chemical with the correct pH can be flushed and soaked in the lines, 3) The chemical is soaked in the lines for the correct period of time on a set number of chemical cycles in order to break down the contamination, and 4) The correct volume of water is then flushed through the lines to fully remove the chemicals in the lines.

There are various problems associated with cleaning these lines manually. These are: 1) A large amount of time and effort is required to clean lines according to brewery specifications by trained personnel, 2) Lines need to be cleaned in unsociable hours when the bar is closed, 3) The quality of how lines have been cleaned is unknown, 4) When and which lines have been cleaned needs to be manually recorded and 5) There is wasted beverage after line cleaning 6) Resource requirements are not optimized for different beverage lines depending on their characteristics, resulting in wasted water, detergent and labor.

Moreover, manual mixing up of the cleaning solution (usually diluted sodium hydroxide solution) is prone to error. The cleaning period is timed manually and is also prone to error. The quantity of water used for rinsing may not be adequate and hence the beverage line may still have traces of cleaning agent. There may have traces of cleaning agent after the final rinse, if the water tank was not properly rinsed free of the sodium hydroxide solution before it was filled with the final rinse fresh water. The container holding the concentrated sodium hydroxide solution has to be handled and measured manually. This measuring process prone to spills, and often comes in contact with the operator's skin since, in practice, safety gloves and goggles are seldom used.

As the cleaning performance is highly correlated to the qualification of the personnel and there is a plurality of parameters which may affect the cleaning quality, manual methods suffer from the disadvantage that there is no guarantee that the above cleaning procedure and the safety and quality recommendations are fulfilled. This is why typically qualified personnel from a service provider is needed for beverage line cleaning in a venue where the beverage dispensing systems are used.

Furthermore, as the manual methods of cleaning beverage lines leaves significant scope for human error and the cleaning parameters are mostly untraceable, it is not possible to ensure proper cleaning has taken place.

There are automated line-cleaning systems available in the state of the art. However, there is still no guarantee that these systems are fully effective. Known automated systems perform line cleaning based on time elapsed for cleaning phase, and there is no automatic indication of whether or not the cleaning process has been effective.

WO 95/12543 discloses a gas pressurized liquid delivery system for dispensing of beverages. Various cycles are provided by a logic circuit, for example, a cleaning cycle, sterilizing cycle and a purge cycle, and the cycles are able to be enacted substantially automatically.

FR 2 354 829 discloses a device for the automatic cleaning of piping systems to be connected to a beverage reservoir. The device comprises at least one unit comprising a portion conveying water and an electrical portion which is separate from the portion conveying water. The portion conveying water is composed of a piping system.

EP 0 487 214 discloses a beverage dispensing system cleaning apparatus including means for selectively supplying cleaning fluid to an inlet of said dispensing system, selectively operable valve means connected with the outlet of said dispensing system, and control means to admit cleaning fluid to said dispensing system and to selectively operate said valve means to effect agitation of the cleaning fluid in the dispensing system.

The existing systems may require beverage container coupler connections to be on the walls instead of being on a portable line cleaning device hence increasing the installation and deployment costs. Moreover, existing apparatuses may require large installation spaces due to large dimensions and wall mounted coupler connections.

This is why these apparatuses are generally not available in countries where flash chillers are commonly used as a part of the beverage dispensing system or where venues have tight installation spaces.

The existing beverage line cleaning apparatuses may save the beverage in the line for sale by pumping fresh water behind the beverage in the line up to the tap on the bar. However, this can affect the quality of the beverages, as it can be watered down. Otherwise the beverage in the lines is typically wasted prior to line cleaning each time. Moreover, the quantity of beverage saved or wasted prior to cleaning is also unknown.

Conventional methods have no way of informing the operator about the line cleaning statistics; hence the quality of the line cleaning process is unknown. Similarly, no record is made of when and which beverage lines have been cleaned and would need to be manually recorded by the operator. Furthermore, the existing beverage line cleaning systems do not have means for using parameters that may affect the line cleaning quality requirements for applying procedural change to the cleaning process for different beverage lines due to the lack of historical data. It is also not available in the state of the art any method for collecting information about beverage line cleaning and transferring it for standardization purposes.

WO 2018/236758 discloses a smart tap for dispensing draft beer and a networked draft beer system comprising said smart tap, the disclosure of which is hereby incorporated by reference. The networked draft beer system includes sensors configured to generate parameter data representing a parameter of fluid flowing along the fluid transfer path of the smart tap and a network connectivity module configured to transmit the parameter data over a network, a server remote from the smart tap and including a module configured to connect the server to the network to receive the parameter data. The disclosed networked draft beer system allows transmitting a plurality of parameter data for quality and sales tracking and analytic applications and controlling electronic valves that can turn on or off beer flow and presenting users information about the beer line status such as beer temperature, beer pressure, amount left in keg, keg freshness etc. It is also a need in the state-of-the-art beverage line cleaning systems which can work in harmony with the data gathered by means of such networked draft beer systems.

It is an aim of the present invention to provide an apparatus and system for cleaning beverage lines which alleviates the above problems, and which greatly increases the accuracy and quality of the cleaning process, while also decreasing the time required to achieve clean beverage lines.

SUMMARY

One aspect of the present invention relates to a beverage line cleaning apparatus comprising:

(a) an input water conduit connected to mains water supply;

(b) a rinsing water conduit and a cleaning fluid conduit each said conduit, being connected to the input water conduit in fluid communication and having at least one fluid control means configurable to either allow or prevent fluid in the respective conduit flowing to a shared output fluid conduit, wherein the output fluid conduit is configured to connect to at least one beverage line in fluid communication;

(c) at least one connector means for connecting the at least one beverage line (200) to said output fluid conduit;

(d) detergent dosing and mixing unit configured to provide a predefined amount of a cleaning fluid into said output fluid conduit through the cleaning fluid conduit;

(e) pump means configured to cause flow of fluid through said rinsing water conduit and cleaning fluid conduit into the output fluid conduit;

(f) at least one sensor configured to generate parameter data representing a parameter of fluid flowing along the cleaning fluid conduit and/or output fluid conduit;

(g) a controller configured to:

receive the parameter data from the at least one sensor;

based at least partly on the parameter data, determine to which to open or close the fluid control means based on real-time sensing of the parameter data.

Another aspect of the present invention relates to a networked beverage line cleaning system comprising:

a beverage line cleaning apparatus including:

(a) an input water conduit connected to mains water supply;

(b) a rinsing water conduit and a cleaning fluid conduit, each said conduit being connected to the input water conduit in fluid communication and having at least one fluid control means configurable to either allow or prevent fluid in the respective conduit flowing to a shared output fluid conduit, wherein the output fluid conduit is configured to connect to at least one beverage line in fluid communication;

(c) at least one connector means for connecting the at least one beverage line (200) to said output fluid conduit;

(d) detergent dosing and mixing unit configured to provide a predefined amount of a cleaning fluid into said output fluid conduit through the cleaning fluid conduit;

(e) pump means configured to cause flow of fluid through said rinsing water conduit and cleaning fluid conduit into the output fluid conduit;

(f) at least one sensor configured to generate parameter data representing a parameter of fluid flowing along the cleaning fluid conduit and/or output fluid conduit;

(g) a network connectivity module configured to transmit the parameter data over a network;

a server remote from the beverage line cleaning apparatus and including:

a module configured to connect the server to the network to receive the parameter data;

a data repository configured to store the parameter data and data representing the beverage line cleaning standards associated with the beverage line;

an analytics engine configured to analyze the parameter data to determine compliance with the beverage line cleaning quality standards; and a recommendation engine configured to:

generate a recommendation or report based on the analytics engine analyzing the data; the recommendation representing whether a venue of the beverage line cleaning apparatus complied with the beverage line cleaning quality standards; and cause output of the recommendation to a related party.

One another aspect of the present invention relates to a networked beverage line cleaning system comprising:

a plurality of beverage line cleaning apparatus each including:

(a) an input water conduit connected to mains water supply;

(b) a rinsing water conduit and a cleaning fluid conduit, each said conduit being connected to the input water conduit in fluid communication and having at least one fluid control means configurable to either allow or prevent fluid in the respective conduit flowing to a shared output fluid conduit, wherein the output fluid conduit is configured to connect to at least one beverage line in fluid communication;

(c) at least one connector means for connecting the at least one beverage line (200) to said output fluid conduit;

(d) detergent dosing and mixing unit configured to provide a predefined amount of a cleaning fluid into said output fluid conduit through the cleaning fluid conduit;

(e) pump means configured to cause flow of mains water through said rinsing water conduit and cleaning fluid conduit into the output fluid conduit;

(f) at least one sensor configured to generate parameter data representing a parameter of fluid flowing along the cleaning fluid conduit and/or output fluid conduit;

(g) a network connectivity module configured to transmit the parameter data over a network;

a server remote from the beverage line cleaning apparatus and including:

a module configured to connect the server to the network to receive the parameter data from the plurality of beverage line cleaning apparatus;

a data repository configured to store the parameter data;

an analytics engine configured to analyze aggregate subsets of the parameter data to identify optimum beverage line cleaning quality standards a recommendation engine configured to:

generate a recommendation or report based on the analytics engine analyzing the data; and cause output of a user interface to a designated user of the recommendation or report.

Another aspect of the present invention relates to a networked system for cleaning at least one beverage line comprising:

a server including:

a data repository configured to store cleaning instructions associated with a beverage line; and a module configured to connect the server to a network and transmit the cleaning instructions to a designated beverage line cleaning apparatus; and a beverage line cleaning apparatus (100) remote from the server and configured for cleaning the beverage line (200), the beverage line cleaning apparatus (100) including:

(a) an input water conduit connected to mains water supply;

(b) a rinsing water conduit and a cleaning fluid conduit, each said conduit being connected to the input water conduit in fluid communication and having at least one fluid control means configurable to either allow or prevent fluid in the respective conduit flowing to a shared output fluid conduit, wherein the output fluid conduit is configured to connect to at least one beverage line in fluid communication;

(c) at least one connector means for connecting the at least one beverage line (200) to said output fluid conduit;

(d) detergent dosing and mixing unit configured to provide a predefined amount of a cleaning fluid into said output fluid conduit through the cleaning fluid conduit;

(e) pump means configured to cause flow of mains water through said rinsing water conduit and cleaning fluid conduit into the output fluid conduit;

(f) at least one sensor configured to generate parameter data representing a parameter of fluid flowing along the cleaning fluid conduit and/or output fluid conduit;

(g) a controller configured to:

receive the cleaning instructions over the network; and during cleaning of the beverage line, control to open or close the fluid control means based on the received cleaning instructions.

A networked beverage line cleaning system comprising:

a beverage line cleaning apparatus (100) configured for cleaning the beverage line (200), the beverage line cleaning apparatus (100) comprising:

(a) an input water conduit (120) connected to mains water supply (800);

(b) a rinsing water conduit (130) and a cleaning fluid conduit (140), each said conduit (130, 140) being connected to the input water conduit (120) in fluid communication and having at least one fluid control means (131, 141) configurable to either allow or prevent fluid in the respective conduit (130, 140) flowing to a shared output fluid conduit (150), wherein the output fluid conduit (150) is configured to connect a beverage line (200) in fluid communication;

(c) at least one connector means (160) for connecting the at least one beverage line (200) to said output fluid conduit (150);

(d) pump means (180) configured to cause flow of fluid through said rinsing water conduit (130) and cleaning fluid conduit (140) into the output fluid conduit (150);

(e) at least one sensor (174) configured to generate parameter data representing a parameter of fluid flowing along the cleaning fluid conduit (140) and/or output fluid conduit (150);

a beverage dispensing tap (300) configured for dispensing a beverage through the beverage line (200), the dispensing tap (300) and/or the beverage line (200) comprising:

a sensor (210) configured to generate parameter data representing a parameter of fluid flowing therethrough; and a valve (220) for controlling the flow of fluid therethrough, wherein the beverage line cleaning apparatus (100) includes:

a controller configured to:

receive the parameter data from the at least one sensor (174, 210);

based at least partly on the parameter data, determine to open or close the valve (220) based on real-time sensing of the parameter data.

a network connectivity module configured to transmit an instruction to the dispensing tap (300) and/or beverage line (200) over a network to control the operation of the valve (220).

| REFERENCE NUMBERS | |
|---|---|
| 100 | Beverage line cleaning apparatus |
| 111 | Power inlet |
| 112 | Water supply hose |
| 113 | Water inlet |
| 120 | Input water conduit |
| 121 | Input water control means |
| 130 | Rinsing water conduit |
| 131 | Output fluid control means |
| 140 | Cleaning fluid conduit |
| 141 | Output fluid control means |
| 142 | Input water control means |
| 143 | Check valve |
| 150 | Output fluid conduit |
| 151 | Output fluid control means |
| 160 | Connector means |
| 170 | Detergent dosing and mixing unit |
| 171 | Refillable detergent box |
| 172 | Mixing chamber |
| 173 | Dosing device |
| 174 | Sensor |
| 175 | Level Sensor |
| 180 | Pump means |
| 190 | Bypass fluid conduit |
| 191 | Bypass fluid control means |
| 200 | Beverage line |
| 210 | Sensor |
| 220 | Valve |
| 230 | Coupler |
| 300 | Dispensing tap |
| 400 | Beverage container |
| 401 | Beverage port |
| 500 | Beer tower |
| 610 | Drip tray |
| 620 | Flash chiller |
| 630 | Pressure source |
| 631 | Regulator |
| 700 | Power source |
| 800 | Mains water supply |

DETAILED DESCRIPTION OF THE INVENTION

Figure 1:
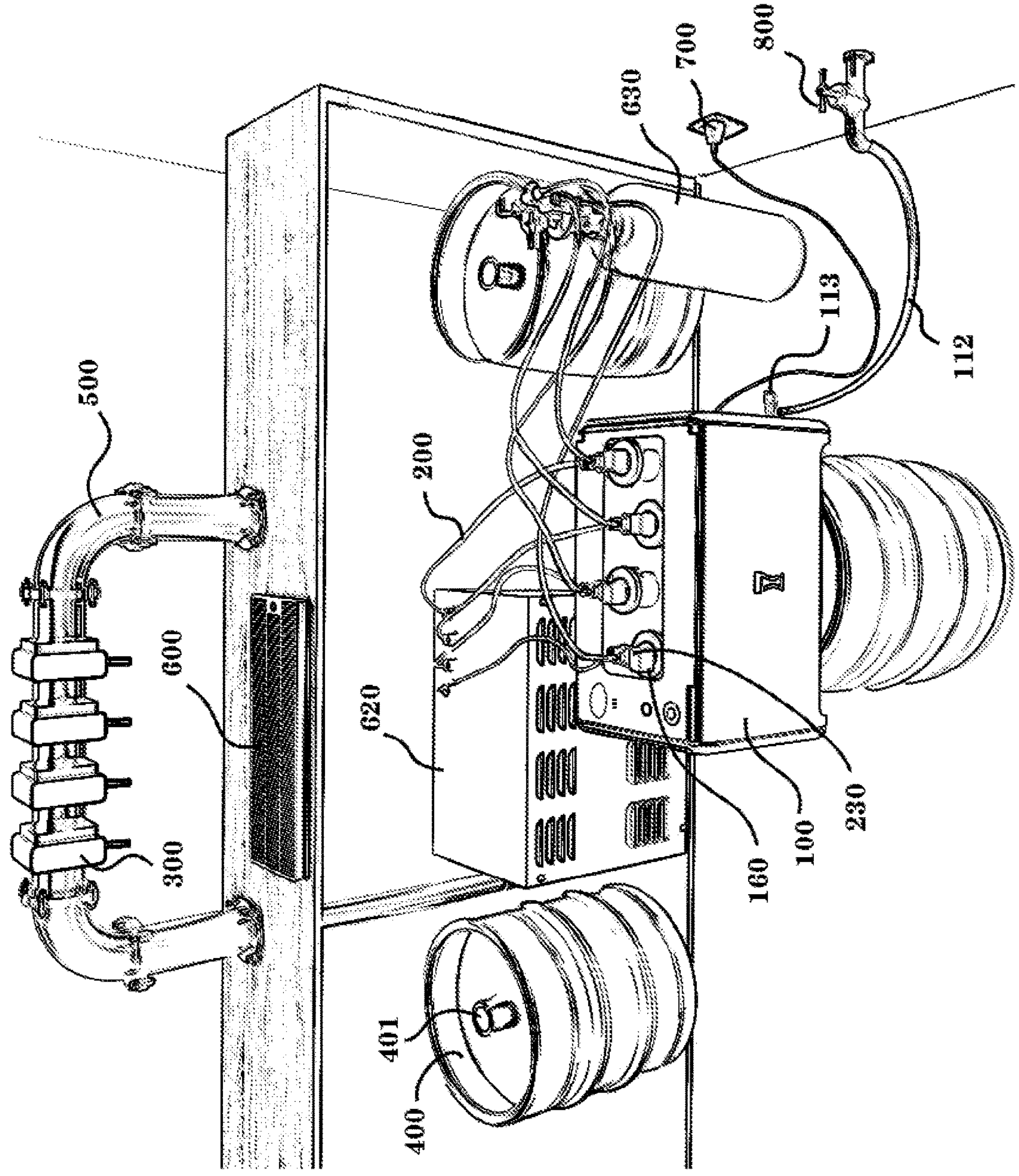
FIG. 1 is a perspective view of an example beverage dispensing system in accordance with the present invention.

The present invention and its various embodiments are described in detail below with reference to the figures.

In general, the present invention relates to an apparatus and system for cleaning the various beverage carrying components of a beverage dispensing system. These components include, without limitation, pipes (also referred to herein as "lines"), dispensing taps, couplers and valves. The apparatus for cleaning a beverage dispensing system as described herein is hereinafter described as a beverage line cleaning apparatus (100). As such, these "beverage carrying components" are referred to herein as "beverage line". The beverage line cleaning apparatus (100) of the present invention dispenses mains water as the washing/rinsing water and a chemical solution as the cleaning fluid formed as a combination of mains water and a cleaning product.

The rinsing water and the cleaning fluid are provided to the beverage dispensing system and supplied through the various beverage carrying components of the beverage dispensing system in order to clean these components for future use. It should be appreciated that the embodiments of the present invention described and claimed below are applicable to clean fluid dispensing systems other than beverage dispensing systems. The cleaning process performed by the beverage line cleaning apparatus (100) is generally defined as being a process during which beverage carrying components of the beverage dispensing system are cleaned by washing/rinsing water and/or a cleaning fluid. To illustrate embodiments of the present invention, the cleaning process is described as having a washing phase, a cleaning phase and a rinsing phase. During the washing phase, the beverage line cleaning apparatus (100) and system applies mains water (also referred to herein as "rinse water") to the beverage dispensing system to force out any beverage residing in the beverage carrying components during the initiation of the cleaning process. The cleaning phase is preferably administered at the conclusion of the washing phase and entails the application of cleaning fluid to clean the beverage carrying components. The rinsing phase is administered at the conclusion of the cleaning phase and entails the application of mains water to the beverage dispensing system to force out any detergent residing in the beverage carrying components. It should be appreciated, however, that the application of the washing phase and cleaning phase without the final rinsing phase or the application of the cleaning phase and rinsing phase without the initial washing phase or the application of the cleaning phase without the others is contemplated within the scope of the present invention. As such, the cleaning process may include only the cleaning phase.

The beverage line cleaning apparatus and system of the present invention have the advantage of speeding up the cleaning process associated with the known manual operation for cleaning the beverage dispensing systems. Depending on the length of the beverage line (200) and also the number of beverage lines (200) being cleaned simultaneously, the degree of improvement can be huge. Thus, the beverage line cleaning apparatus (100) and system of the present invention have the advantage of facilitating more frequent cleaning of the beverage dispensing systems. The beverage line cleaning apparatus (100) also minimizes water and detergent (i.e. cleaning product) resources over other manual and automated methods available by being pre-adjusted with cleaning process to suit the particular needs of the premises in which the beverage line cleaning apparatus (100) is installed. As beverage use may vary depending on various factors such as the venue, type of the dispensing tap and beverage line, type and brand of the beverage, temperature and pressure, service frequency, a cleaning/maintenance program to be applied needs to be specific to the beverage line. The beverage line cleaning apparatus (100) and system also have the advantage of providing beverage line specific cleaning/maintenance program based on statistical cleaning data of this beverage line collected by the apparatus (100) as well as other systems such as the associated dispensing tap (300).

Figure 2:
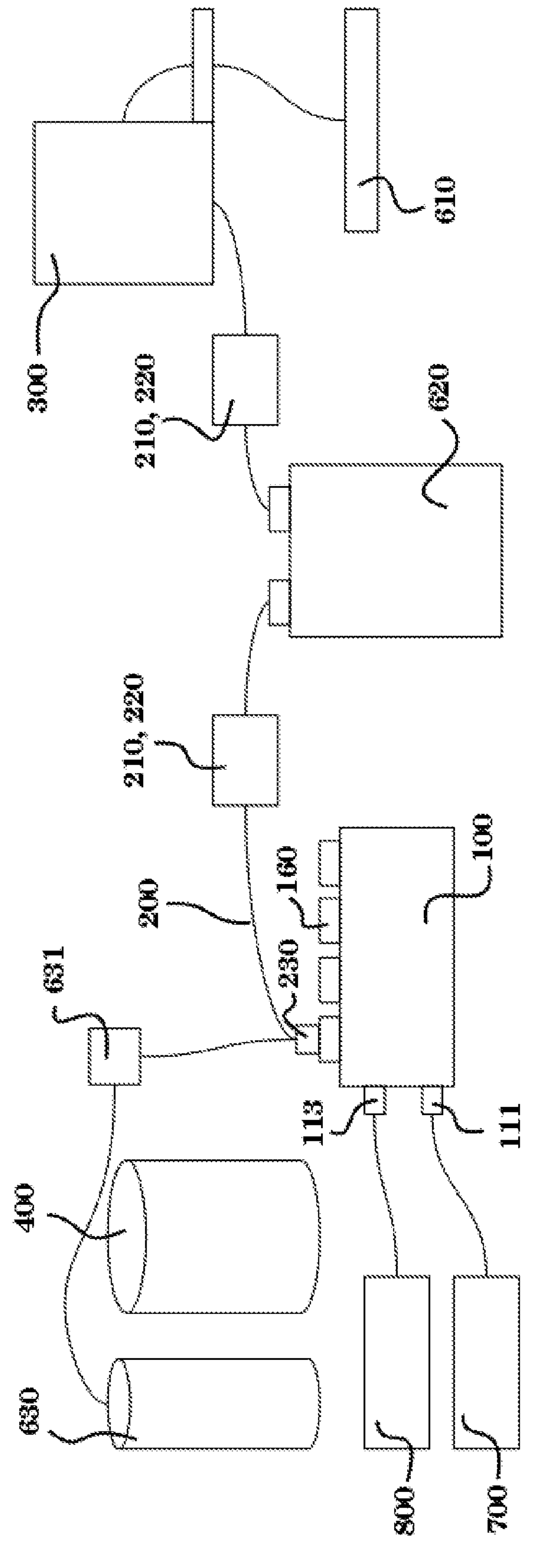
FIG. 2 is an illustrative diagram of an exemplary embodiment of the beverage dispensing system according to the present invention.

FIG. 1 and FIG. 2 illustrate an example beverage dispensing system where an embodiment of the beverage line cleaning apparatus (100) and system are implemented as described herein. While many different types of beverages and beverage dispensing systems are contemplated within the scope of the present invention, the beverage dispensing system is described as being a draft beer dispensing system used to dispense draft beer to bar area of a restaurant. Indeed, the below description of the present invention and its associated environment as being applicable to draft beer dispensing is illustrative only, and consequently beverage dispensing system may be operable to dispense any other type of beverage, such as, for example, soda, juices, coffees and dairy products.

The beverage dispensing system dispenses different labels of beverage through individual dispensing taps (300). Prior to being dispensed, the beverages are contained in beverage containers (400). The beverage containers (400) are illustrated in FIG. 1 and FIG. 2 as being conventional-sized kegs in accordance with an embodiment of the present invention. However, any other type and size of beverage container (400) from which a beverage may be supplied will suffice. Whereas the beverage containers (400) are usually stored in the cellar area or a cooling room (not shown) the beverage dispensing units including for example draft beer tower (500) and dispensing taps (300) are located in the bar area. Each dispensing tap (300) is fluidly connected to a beverage container (400) by a beverage line (200). The dispensing taps (300) can be operated by a user (for example a bartender) in order to dispense beverage from the beverage container (400) into a glass. The dispensing taps (300) which are configured for pouring a beverage from the beverage containers (400) through beverage lines (200) may be connected by a drainage hose or tube to a wastewater drain through a drip tray (610).

As known to those skilled in the art of beverage dispensing, an optional flash chiller (620) or the like may be used to further chill beverages transported between the beverage containers (400) and the dispensing taps (300). The flash chiller (620) cools down the beverage on the fly during the beverage service. The flash chiller (620) may also contain a long piping inside that is required to be cleaned. The flash chiller (620) comprises an input port that accepts beverage to be cooled down on the fly. The flash chiller (620) also comprises an output port (not shown) that provides cooled beverage to the dispensing tap (300).

Each beverage line (200) is connected to an associated beverage container by a coupler (230). Each coupler (230) is affixed to a beverage port (401) on the associated beverage container (400) through which the beverage is output for direction by the coupler (230) to the associated beverage line (200). The couplers (230) can have different types and shapes based on the geographical regions. The pressure used to force beverages from the beverage containers (400) to the dispensing taps (300) via beverage lines (200) is supplied to the couplers (230) from one or more pressure source(s) (630). This pressure source (630) is shown in accordance with an embodiment as being compressed gas tanks. The pressure source (630) may also be connected to a pressure regulator (631) regulating the gas pressure to a predefined value.

So far, the features described are used to deliver beverage from the beverage container (400) out through one of the dispensing taps (300).

Figure 3:
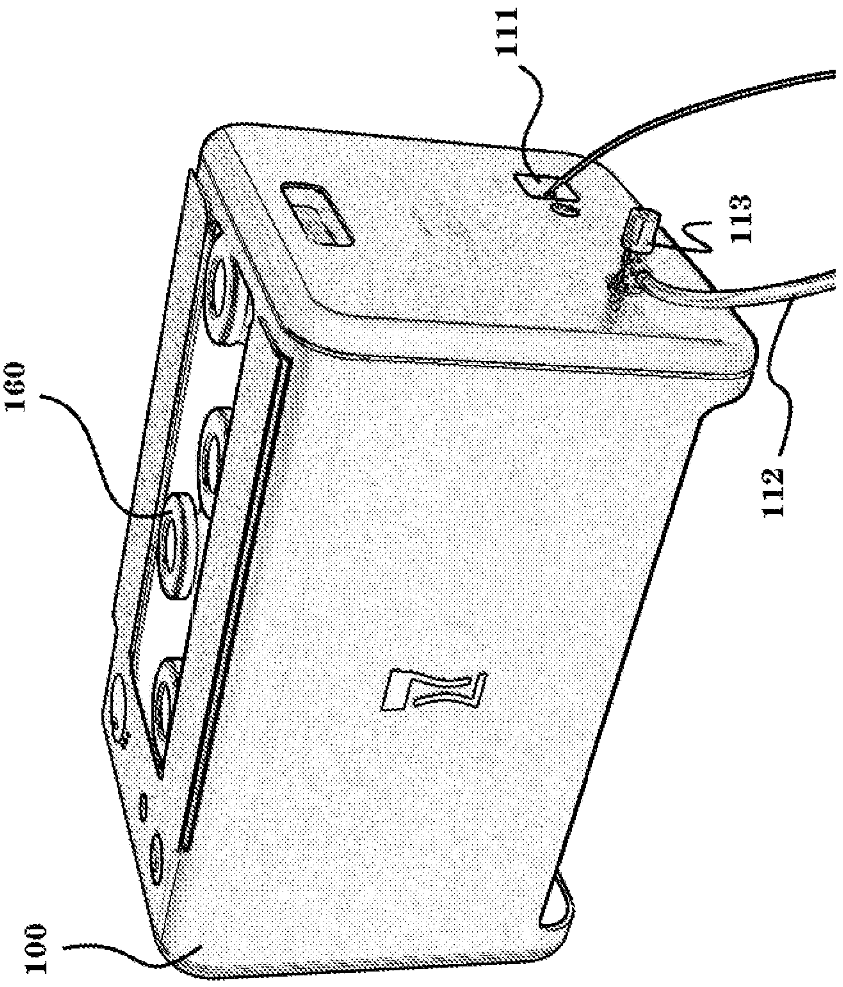
FIG. 3 is a perspective view of an exemplary beverage line cleaning apparatus according to the present invention.

As described generally above, the present invention relates to cleaning various components of a beverage dispensing system. FIG. 1 and FIG. 2 also illustrates the integration of a beverage line cleaning apparatus (100) to the beverage dispensing system and FIG. 3 illustrates a perspective view of the beverage line cleaning apparatus.

The beverage line cleaning apparatus (100) is powered by a power source (700). In one embodiment, the apparatus has a power inlet (111) connected to the general public electricity grid. It is also possible that the beverage line cleaning apparatus (100) can be powered by a DC power supply and it is connected to the general public electricity through a DC adaptor. The output voltage may vary depending on the geography. The beverage line cleaning apparatus (100) is connectable to a mains water supply (800) typically by a water supply hose (112) that provides mains water to a water inlet (113) of the beverage line cleaning apparatus (100). The mains water supply (800) is basically a faucet that provides mains water from the general public water network. In one embodiment the beverage line cleaning apparatus (100) is directly connected to the mains water supply (800) by a water supply hose (112) so that there is no need to use or include a water tank.

Figure 4:
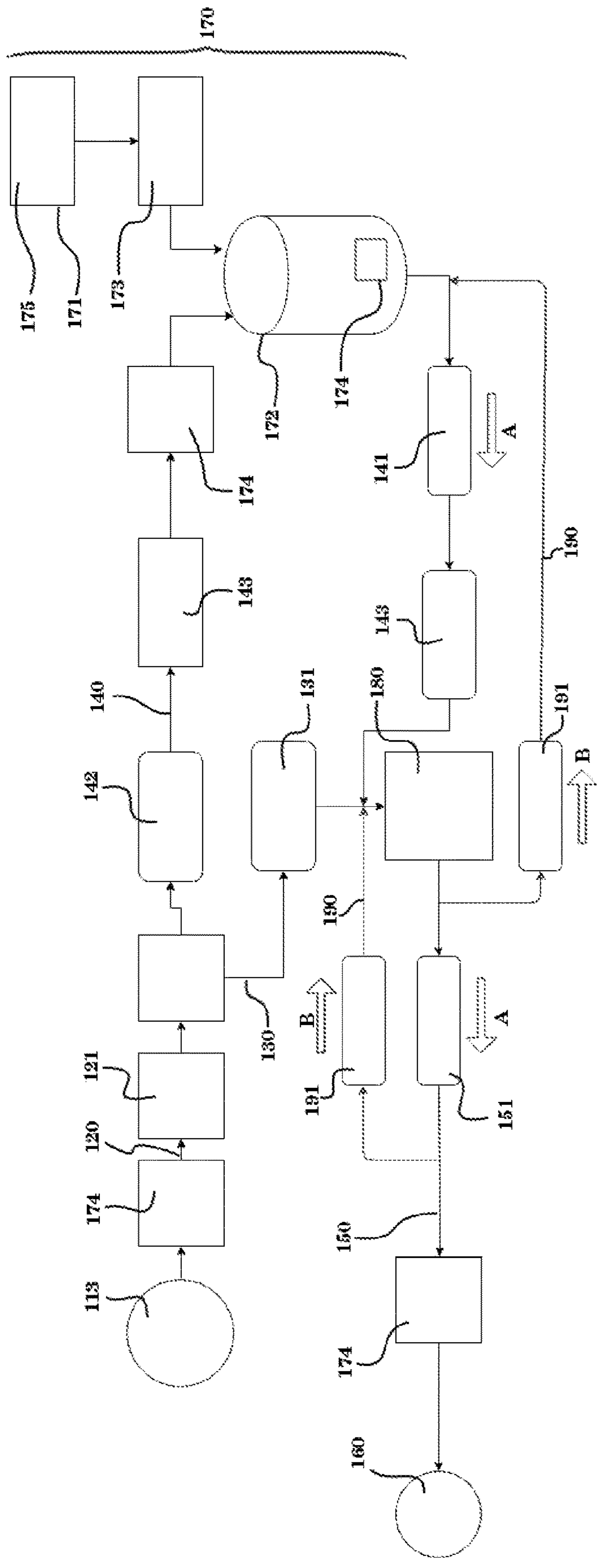
FIG. 4 is an illustrative diagram of an exemplary embodiment of the beverage line cleaning apparatus according to the present invention.

The beverage line cleaning apparatus (100) is connectable to at least one beverage line (100) and the mains water supply (800) and a fluid transfer path is formed between the mains water supply (800) and the at least one beverage line (200) to the associated dispensing tap (300) when this connection is made. FIG. 4 illustrates a diagram of an embodiment of the beverage line cleaning apparatus (100). The beverage line cleaning apparatus (100) comprises an input water conduit (120) connected to mains water supply (800) through the water inlet (113), a rinsing water conduit (130) and a cleaning fluid conduit (140), each said rinsing water conduit (130) and cleaning fluid conduit (140) being connected to the input water conduit (120) in fluid communication and having at least one fluid control means (131, 141) configurable to either allow or prevent fluid in the respective conduit (130, 140) flowing to a shared output fluid conduit (150), wherein the output fluid conduit (150) is configured to connect to at least one beverage line (200) in fluid communication. In this specific embodiment the input water conduit (120) branches into the rinsing water conduit (130) and the cleaning fluid conduit (140), said conduits (130, 140) being led to the output fluid conduit (150) in fluid communication.

The beverage line cleaning apparatus (100) is connectable to at least one beverage line (200) through the couplers (230) at the ends of beverage lines (200). In order to connect the output fluid conduit (150) to the at least one beverage line (200) the beverage line cleaning apparatus (100) is provided with at least one connector means (160). This removes the need for a space for installation on the wall for coupler connections. The beverage line cleaning apparatus (100) can be provided with one or more connector means (160) for connecting one or more beverage lines (200) at the same time. The typical step performed for this connection is first disconnecting the coupler (230) from the beverage container (400) such as a beer keg and connect it to the connector means (160) of the beverage line cleaning apparatus (100). Thus, the connector means (160) is engageable with the coupler (e.g. connector or socket) (230) at the end of the beverage line (200). As the beverage line (200) is connected with the associated dispensing tap (300) at its other end in the bar mains water can flow through the beverage line (200) to the dispensing tap (300) when the beverage line (200) is connected to the beverage line cleaning apparatus (100). In one embodiment, the beverage line cleaning apparatus (100) comprises one connector means (160) which is configured to connect more than one beverage line (200) at the same time. In this embodiment, the connector means (160) is engageable with more than one coupler (230). In another embodiment, the beverage line cleaning apparatus (100) comprises more than one connector means (160) each of which are configured to connect one beverage line (200) at the same time. In this embodiment the connector means (160) can be mechanical valves which can be connected in series with the output fluid conduit (160) hence allowing more than one beverage line (200) to connect the output fluid conduit (160).

The beverage line cleaning apparatus (100) comprises a detergent dosing and mixing unit (170) which has the advantage that it minimizes splashes which otherwise may occur while the cleaning fluid container is being replaced and also holds the detergent dosing and mixing unit (170) safely within the beverage line cleaning apparatus (100) so as to avoid accidents. Thus, the present invention overcomes the problem of handling of the cleaning fluid which can be dangerous and provides a means of storing the container of detergent. The detergent dosing and mixing unit (170) comprises a refillable detergent box (171) and a mixing chamber (172). The refillable detergent box (171) is configured to store an amount of detergent and allow the operator adding detergent into the detergent box (171) when needed. This removes the requirement for replacing the detergent box (171) with a new one and overcomes the problem that the detergent loses its effect because of long-term exposure to air. The mains water can flow into the mixing chamber (172) and is ceased when full by at least one input water control means (142). This input water control means (142) can be a valve, preferably a solenoid valve. Detergent supplied from the refillable detergent box (171) is mixed with mains water in the mixing chamber (172) for forming a cleaning fluid. The supply of detergent from the refillable detergent box (171) occurs through a controllable dosing device (173) configured to supply a predefined amount of detergent to the mixing chamber (172). For example, the controllable dosing device (173) may be a peristaltic pump. The cleaning fluid is then allowed to flow through the cleaning fluid conduit (140) into the output fluid conduit (150) and out through the beverage line (200). The detergent dosing and mixing unit (170) has a controller based system that manages the overall preparation and administration of cleaning fluid to the beverage dispensing system. The detergent dosing and mixing unit (170) can also allow controlling whether the cleaning fluid complies with the beverage line cleaning standards.

The beverage line cleaning apparatus (100) also includes at least one pump means (180) for causing flow of mains water into the output fluid conduit (150) through the rinsing water conduit (130) and the cleaning fluid conduit (140). The pump means (180) are provided on the fluid transfer path of the beverage line cleaning apparatus (100), preferably upstream of the rinsing water conduit (130) and cleaning fluid conduit (140). In one embodiment pump means (180) are provided upstream of the rinsing water conduit (130) and cleaning water conduit (140) and downstream of the output conduit (150).

The rinsing water conduit (130) and the cleaning fluid conduit (140) have output fluid control means (131, 141) configurable to either allow or prevent fluid in the respective conduit (130, 140) flowing to a leading a shared output fluid conduit (150). These fluid control means (131, 141) can be fitted to or built into the rinsing water conduit (130) and cleaning water conduit (140), or as a complete unit to allow the fluid running through the respective conduit (130, 140) into the output fluid conduit (150). Both output fluid control means (131, 141) are selectively and independently moveable between an open position in which the fluid can flow through the respective conduit (130, 140) into the output fluid conduit (150) and a closed position in which the flow of fluid through the respective conduit (130, 140) is prevented. Opening the output fluid control means (131, 141) brings the rinsing water conduit (130) and the cleaning fluid conduit (140) into flow communication with the output fluid conduit (150). Thus, opening the output fluid control means (131) of the rinsing water conduit (130) allows the rinsing water to flow into the output fluid conduit (150) and opening the output fluid control means (141) of the cleaning fluid conduit (140) allows the cleaning fluid to flow into the output fluid conduit (150). With this arrangement two alternating or parallel fluid transfer paths are provided within the beverage line cleaning apparatus (100), one is through the rinsing water conduit (130) into the output fluid conduit (150) and the other one is through the cleaning fluid conduit (140) into the output fluid conduit (150).

As depicted in FIG. 4 in order to control the dispensation of the mains water the beverage line cleaning apparatus (100) may comprise other fluid control means positioned at various points along the fluid transfer paths. In the illustrated embodiment, the output fluid conduit (150) has at least one output fluid control means (151) configurable to either allow or prevent fluid in the output fluid conduit (150) flowing to the at least beverage line (200). Furthermore, the input water conduit (120) has at least one input water control means (121) configurable to either allow or prevent mains water flowing to the input water conduit (120). The cleaning fluid conduit (140) also has at least one input water control means (142) configurable to either allow or prevent mains water flowing to the cleaning fluid conduit (140) and allows filling the mixing chamber (172) with mains water. Said fluid control means (121, 142) are selectively and independently moveable between an open position in which mains water can flow through the respective conduit (120, 140) and a closed position in which flow of the mains water through the respective conduit (120, 140) is prevented. Opening the input water control means (142) of the cleaning fluid conduit (140) brings the input water conduit (120) into flow communication with the cleaning fluid conduit (140) and allow the mains water to flow into the cleaning fluid conduit (140). Closing the input water control means (142) of the cleaning fluid conduit (140) and opening the output fluid control means (131) allow the mains water to flow into the rinsing water conduit (130) and prevents the same to flow into the cleaning fluid conduit (140). The direction of the flow of mains water to either the rinsing water conduit (130) or the cleaning fluid conduit (140) can be controlled by means of opening/closing the fluid control means (131, 142).

In one embodiment the beverage line cleaning apparatus (100) is provided with at least one bypass fluid conduit (190) in order to create a forward-backward motion of cleaning fluid for increasing the efficiency of the cleaning process. The bypass fluid conduit (190) is configured for connecting the output fluid conduit (150) in fluid communication to the mixing chamber (172) thereby the pump means (180) can cause flow of at least a part of the fluid directly from the output fluid conduit (150) back into the mixing chamber (172). In order to control this flow, the bypass fluid conduit (190) has at least one bypass fluid control means (191) configurable to either allow or prevent fluid in the output fluid conduit (150) flowing back to the mixing chamber (172). The direction of the flow of the fluid whether it is from the beverage line cleaning apparatus (100) to beverage lines (200) (i.e. forward direction, A) or it is from the beverage lines (200) into the beverage line cleaning apparatus (100) (i.e. backward direction, B) can also be controlled by the fluid control means (131, 141) and bypass fluid control means (191) In the specific embodiment illustrated in FIG. 4 there is one bypass fluid conduit (190) connecting the output fluid conduit (150) in fluid communication to the mixing chamber (172) wherein the pump means (180) intersects the bypass fluid conduit (190) and there are two bypass fluid control means (191), one of which is downstream of the pump means (180) and one of which is upstream of the pump means (180). The forward-backward motion is created by sequentially opening and closing bypass fluid control means (191) for a specified on and off cycle, for a period of time. This sequential opening and closing action produces rapid loading and unloading of the pump means (180) and thus causes agitation of fluid throughout the beverage lines (200). This agitation action greatly enhances the cleaning of the beverage lines (200).

The controller can control the opening/closing of fluid control means (121, 131, 141, 142, and 191). These fluid control means typically comprise controllable valves, such as solenoid valves. There may also be check valves (143) along the conduits for preventing back flow of fluid therethrough. In the illustrated embodiment, there is a check valve (143) upstream of the input water control means (142) along the cleaning fluid conduit (140) and there is a check valve (143) upstream of the output fluid control means (141) along the cleaning fluid conduit (140).

A number of sensors (174) can be positioned at points along or within the fluid transfer paths of the beverage line cleaning apparatus (100) in order to sense parameters of the mains water, rinsing water and cleaning fluid. Such parameters include but not limited to the amount of flowing fluid, the time and duration of the flow, pH, conductivity, temperature, pressure and color of the flowing fluid. The sensor (s) (174) can include one or more of a flow meter, temperature sensor, pressure sensor, optical sensor, color sensor and level sensor. In one embodiment, the sensor (174) may be a flow meter positioned along the fluid transfer path to volumetrically track fluid flowing through the beverage line cleaning apparatus (100) that detects whether the flow and volume of fluids (e.g. mains water that has entered the input conduit and rinsing water that has entered the beverage lines) comply with the beverage line cleaning quality standards and thresholds. In the same or another embodiment, the beverage line cleaning apparatus (100) comprise sensors (174) configured to sense the parameters of the cleaning fluid when it is in the mixing chamber (172) and/or after it is allowed to flow from the mixing chamber (172). This allows checking whether the volume of the cleaning fluid and the concentration of the detergent comply with beverage line cleaning quality standards and thresholds. In a similar approach, the parameters of the flushing fluid which had been sucked back into the mixing chamber (172) can be sensed by the sensors (174) in the mixing chamber (172) to check if the cleaning process is performed properly. In this embodiment for example, the sensor (174) comprises a pH electrode intended for monitoring the concentration of the cleaning fluid or flushing fluid although it will be understood that alternative means of monitoring the concentration of the cleaning fluid can be used, e.g. an optical sensor, capacitive, light frequency, conductivity or microscopic methods. In another embodiment the refillable detergent box (171) includes a level sensor (175) configured to sense the level of the detergent remaining in the refillable detergent box (171). The level sensor (175) is configured to generate a parameter data representing the amount of detergent in the refillable detergent box (171) so that an output can be generated that the detergent is sufficient and insufficient for the cleaning process. The sensor (174) can be provided within a sensor box, or can be positioned spaced apart along the fluid transfer paths as desired based on the parameters to be sensed.

Optionally, the beverage line cleaning apparatus (100) can communicate with remote sensors and valves existing in the beverage dispensing system and/or environment. Such sensors can include a sensor (210) or valve (220) which have been positioned within or on the beverage dispensing system including the beverage line (200) and dispensing tap (300). The sensor has been configured to generate parameter data representing a parameter of fluid flowing along the fluid path of the beverage line (200) and/or dispensing tap (200) and to communicate their data to the beverage line cleaning apparatus (100). The valve (220) has been configured to control the beverage flowing along the fluid path of the beverage line (200) and/or dispensing tap (200) and to communicate their data to the beverage line cleaning apparatus (100). These communications may be made between the beverage line cleaning apparatus (100) and the sensor (210) and/or valve (220) directly via wireless connectivity or indirectly via software interfaces on their corresponding remote servers. The sensor (210) and/or valve (220) may be positioned in the associated dispensing tap (300) or on the beverage line (200). The dispensing tap (300) may be a "smart tap" which can communicate over a network with a central data repository that stores sensor data from a number of different dispensing taps as described in WO 2018/236758. The dispensing tap as described in WO 2018/236758 is hereinafter referred to herein as "smart tap" If the dispensing tap (300) is the smart tap, such data communication can be made by using a network as described herein. Such data communication allows the beverage line cleaning apparatus (100) to work in harmony with the parameter data gathered from the dispensing tap that provide information about beverage quality and sales and that control the flow of beverage either on/off or proportionality.

It is possible that a number of sensors (210) are positioned at points along the fluid transfer paths within or on the beverage dispensing system including the beverage lines (200) and dispensing taps (300) such as smart taps for quality and sales tracking and analytics applications and controlling the flow of beverage therethrough. These sensors (210) can generate parameter data representing a parameter of beverage flowing in the beverage line (200). Such parameters include but not limited to the amount of flowing fluid, the time and duration of the flow, pH, conductivity, temperature, pressure and color. The sensor(s) (210) can include one or more of a flow meter, temperature sensor, pressure sensor, optical sensor and color sensor. In one embodiment, the sensor (210) may be a flow meter, pH sensor or conductivity sensor positioned in the beverage line (200) or dispensing tap (300) and configured to detect whether a certain fluid is a cleaning fluid or rinse water or beverage and transmit this data via wired and/or wireless connections to the controller of the beverage line cleaning apparatus (100) or through the software interfaces on their respective remote servers thereby allowing the remaining beverage in the beverage line (200) at time of washing phase to be used or sold so as to minimize costs.

For example, the color sensor (210) may be used to detect the cleaning process such as the cleaning fluid flowing through the beverage line (200) and/or dispensing tap (300) in order to determine whether these parts are completely cleaned. When the beverage lines (200) are dirty, the color of the cleaning fluid in the beverage line (200) and/or in the dispensing tap (300) is different than the color when it is completely cleaned. The data from this example color sensor (210) is transmitted via wires and/or wireless connections to the controller of the beverage line cleaning apparatus (100) or through the software interfaces on their respective remote servers. The controller can use the data from the color sensor (210) to determine that the beverage lines (200) are still not completely cleaned and the detergent dosing and mixing unit (170) can be activated by the controller in order to prepare a desired quantity of cleaning fluid and the respective fluid control means are opened by the controller for dispensing the cleaning fluid into the beverage lines (200). However, in some embodiments, all of the sensors (174) are contained within and/or provided on the beverage line cleaning apparatus (100). Accordingly, it is also possible to measure the cleaning fluid and/or washing/rinsing water by sucking it from the beverage lines (200) to the mixing chamber (172) and checking by means of the sensors (174) within the beverage line cleaning apparatus (100) such as a color sensor (174) within the mixing chamber (172) if the cleaning process is performed properly.

The beverage line cleaning apparatus includes a display provided on an exterior surface of the beverage line cleaning apparatus that can display sensed parameters and certain menu options relating to the operation of the beverage line cleaning apparatus. The display can allow a user to monitor and control the operation of the beverage cleaning apparatus and system through a touch screen interfaces. The display can be used to provide icons to a user that represents real time operations of the cleaning process, including status, error/warnings and instructions associated with the same. Furthermore, the display may provide a selection screen to the user that enables the user to control aspects of the cleaning process by defining or modifying the phases (e.g. whether the cleaning process is to have a washing phase, a cleaning phase, a rinsing phase or all), amount of time that each phase is to be administered, amount of washing/rinsing water or cleaning fluid, the concentration of cleaning fluid to be dispensed for cleaning phase or the date and time of washing, cleaning and rinsing phases e.g. present. Alternatively, as described below the user may interact with the beverage line cleaning apparatus by way of an external computing device (referred to herein as "user device"), which may be wireless or wire-based. Examples of computing devices can include tablets, smart phones, smart watches, smart glasses.

The beverage line cleaning apparatus is operated under control of an electronic card that stores and executes the operating instructions for the apparatus. The electronic card can be fixed to any region of said apparatus. The electronic card can operate the beverage cleaning apparatus based on instructions including but not limited to: (i) whether the cleaning process is to have a washing phase, a cleaning phase, and/or a rinsing phase, (ii) amount of time (duration) that each phase is to be administered, for example as is entered via the user interface, (iii) amount of washing/rinsing water or cleaning fluid, (iv) the concentration of cleaning fluid to be dispensed for cleaning phase, (v) the date and time of washing, cleaning and rinsing, (vi) sensors positioned at points along the fluid transfer path, for example within or on the beverage line cleaning apparatus such as pH sensor positioned any location along the cleaning fluid conduit, for example fixed to the mixing chamber, or within or on the beverage lines and/or dispensing taps, (vii) conductivity, (viii) the temperature value and the pressure value of the fluid flowing within or on the beverage line cleaning apparatus, the beverage lines and/or dispensing taps, (ix) location (x) beverage brand and (xi) user.

The electronic card includes the wired or wireless communication interface that operates to send (e.g. to a specified IP address) data representing the fluid flowing along the conduits of the beverage line cleaning apparatus and beverage lines and dispensing taps or to receive some set of operating instructions. The electronic card includes interfaces configured to evaluate and process the data coming from the beverage line cleaning apparatus and beverage lines and dispensing taps and the sensors.

The beverage line cleaning apparatus provides automated cleaning process based on sensed parameters, and/or stored information associated with cleaning process being performed. Operations of the beverage line cleaning apparatus and system are controlled by the controller that controls and monitors various tasks administered by the beverage line cleaning apparatus in performance of a cleaning process. For this purpose, the controller is configured to, based at least partly on the parameter data, determine to which to open or close the output fluid control means based on real-time sensing of the parameter data.

The controller is configured to communicate with at least one sensor (174, 175) within or on the beverage line cleaning apparatus and at least one sensor (210) and/or valve (220) within or on the dispensing system including beverage line (200) and dispensing tap (300) to detect the presence, type, amount, concentration, temperature and pressure of fluid that pass therethrough. For example, the total amount of mains water entered into the input water conduit(120) is checked by an input flow meter and based on the threshold (for example the amount according to the beverage line cleaning quality standards) the input water control means (121) is kept open or closed by the controller. In one embodiment, the controller is configured to communicate with a pH sensor (174) which is located in the cleaning fluid conduit (140) and configured to monitor the concentration of the cleaning fluid passing through the cleaning fluid conduit (140) to the output conduit (150). In another embodiment, the controller is configured to receive the output signal of the sensor and to control the detergent dosing and mixing unit (170) in order to increase detergent supplied from the refillable detergent box (171) into the mixing chamber (172) if the concentration is detected lower than a threshold (e.g. when pH is lower than 12-13). In another embodiment the controller is configured to communicate with the level sensor (175) which is located in the refillable detergent box (171) and configured to monitor the level of the remaining detergent. The controller can prevent the operation of the beverage line cleaning apparatus (100), if the refillable detergent box (171) is empty or the level is too low based on the output signal received from the level sensor (175). In another embodiment the controller is configured to communicate with the valve (220) positioned within the beverage dispensing system such as dispensing tap (300) and to control the valve (220) in order to block the dispensation of beverage if the beverage line (200) is not cleaned on time or the performed cleaning does not comply with the standards and allow the dispensation after the cleaning is performed or the standards are complied with.

The controller can control at least some of the pump means (180), fluid control means (e.g. valves), regulators or the like used to pull mains water from the input water conduit (120) and enable the flow of the washing/rinsing water and cleaning fluid within the beverage cleaning apparatus (100) as well as some of the pump means, fluid control means, regulators or the like used to enable the flow of washing/rinsing water and cleaning fluid in the beverage dispensing system like beverage lines and dispensing taps. The controller also monitors and manages the operation of the detergent dosing and mixing unit. For this purpose, the controller is also configured to control dosing device of the detergent dosing and mixing unit.

The controller includes at least one electronic hardware processor ("processor") and at least one associated memory component ("memory"), the electronic hardware processor being in communication with the memory. The memory can include a computer-readable medium configured to store fluid control means opening/closing instructions, dosing device opening/closing instructions and cleaning fluid dispensing control instructions. The computer-readable medium can also be configured to store display control instructions and data communication instructions. The memory can also include a data repository configured to store cleaning fluid characteristic data representing the cleaning fluid currently configured to flow through the beverage lines, historical sensed parameter data and historical maintenance data, historical flow conditions of cleaning fluid through the beverage lines, and historical maintenance data. The memory can be configured to store predetermined windows of such data, and the controller can be configured to periodically clear data from timeframes older than the predetermined windows. The controller may first confirm that such data has been sent to a remote data repository before clearing. The processor(s) of the controller can execute the stored computer-readable instructions and process the described sensor data to cause operation of the beverage line cleaning apparatus.

The controller can also include at least one network connectivity module. The network connectivity module can be, for example, an antenna, a cellular modem, Bluetooth, wireless (e.g., 802.11 Wi-Fi connection), or wired network connection to enable the beverage line cleaning apparatus to send and receive data over a network (e.g., satellite communications network, local area network, or large area network such as the Internet). One example of a suitable antenna can provide 2.4 GHz Wi-Fi, Bluetooth, or Low PAN connectivity as well as one of the following additional connections: GSM/GPRS Quad Band, LTE CAT M1, narrow band IoT (NB-IoT). For example, a Bluetooth connection may pair the beverage line cleaning apparatus with the personal computing devices (e.g., tablets, smartphones, smart watches, smart glasses, etc.) of bar managers, bartenders, and bar service personnel. This pairing can be used in some examples to update the settings of the beverage cleaning apparatus (e.g., defining and modifying the phases of the cleaning process, amount of time/duration that each phase is to be administered, the amount of washing/rinsing water or cleaning fluid to be dispensed for the phases, the concentration of cleaning fluid to be dispensed for cleaning phase or the date and time of washing, cleaning and rinsing phases). A Wi-Fi connection can connect the beverage line cleaning apparatus to a bar/restaurant network to send data to and receive data from remote servers. A GSM/GPRS, LTE CAT M1, or NB-IoT connection can be used to send data to and receive data from remote servers. Wireless connectivity can be used to update device firmware on the field. The devices can send and receive encrypted data. The stored instructions and/or data may be accessed via a wireless network connection and/or a wired connection with another device to the port, which can be a USB (e.g., standard USB, micro-USB, USB-C) port in some examples. Port can also provide programming access for updating the controller. The port can be waterproof.

An example of the operation of the beverage cleaning system under the control of the controller will now be described. It will be appreciated that the order of some of the steps described herein can be changed and some of them could be repeated or omitted whilst still providing an effective method for cleaning beverage lines. The operator first uncouples the beverage lines from the beverage containers by means of removing couplers and connects the beverage lines to the connector means of the beverage line cleaning apparatus. The operator also closes the gas tank which is connected to the coupler through the pressure regulator. The power outlet and water supply connections of the beverage line cleaning apparatus are made by the operator. If the amount of the detergent in the detergent box is not sufficient at the start of the cleaning process the level sensor outputs that the detergent is insufficient and the controller displays status and/or alert messages on the display. After the operator refills the detergent box the controller starts the cleaning process.

The cleaning process may be started under the control of the controller after the operator has pressed an appropriate button on the beverage cleaning apparatus (100) to initiate the cleaning process or after the operator has started the cleaning process by means of a computing device connected to the beverage cleaning line apparatus (100). At the start of the cleaning process mains water from the mains water supply (800) may be flushed through the beverage lines (200) by means of pump means (180) delivering it through rinsing water conduit (130) and output conduit (150) and out through the connected beverage lines (200). This is done by keeping the fluid control means along the fluid transfer path throughout the input water conduit (120), rinsing water conduit (130) and output fluid conduit (150) open while the fluid control means along the fluid transfer path throughout the cleaning fluid conduit (142, 141) closed. This washing phase allows that the remaining beverage in the beverage line (200) at time of washing phase to be used.

Next, cleaning fluid is prepared from the mains water in the detergent dosing and mixing unit (170). In order to do this the mains water is drawn in the mixing chamber (172) by means of the pump means (180) delivering it through cleaning fluid conduit (140) by keeping the input water control means (121, 142) along the fluid transfer path throughout the input water conduit (120) and cleaning fluid conduit (140) open and the fluid control means (131) in the rinsing water conduit (130) closed. A predefined amount of detergent is supplied from the refillable detergent box (171) into the mixing chamber (172) by the dosing device (173). The cleaning fluid is then allowed to flow through the cleaning fluid conduit (140) and the output conduit (150) and out through the beverage lines (200) by keeping the output fluid control means (141, 151) along the fluid transfer path throughout the cleaning fluid conduit (140) and output fluid conduit (150) open. It is possible that the pump means (180) in the beverage line cleaning apparatus (100) and/or beverage lines (200) can be interrupted for shutting down power to the pump means (180) for soaking the beverage lines (200) by the cleaning fluid during the cleaning phase. It is also possible that soaking the beverage lines (200) by the cleaning fluid can be performed by controlling the flow of the cleaning fluid out through the dispensing tap (300). The dispensing tap (300) can be closed for stopping the flow of cleaning fluid for soaking and re-opened for draining the fluid out through the dispensing tap (300). Such a close/open instruction can be sent to the associated dispensing tap (300) either directly or using a network as described herein. Such an administration is also controlled by the controller. The concentration of detergent in the cleaning fluid is kept substantially constant by the controller whilst cleaning fluid is being delivered to the beverage lines (200). The controller uses the output of pH sensor, conductivity sensor or color sensor to monitor the concentration of the detergent in the mixing chamber (172), the cleaning fluid conduit (140), the output fluid conduit (150), the beverage lines (200) and/or dispensing taps (300). In order to do this parameter data such as pH, conductivity or color of the flushing fluid flowing through the beverage lines (200) during the cleaning phase is generated by the sensors (210) existing in the beverage line (200) and/or dispensing tap (300) or by the sensors (174) located in the mixing chamber (172) of the beverage line cleaning apparatus (100) after sucking the flushing fluid into the mixing chamber (172) during the cleaning phase.

If the pH value of the cleaning fluid is not equal to the threshold or not within an acceptable range the controller sends a signal to the input water control means (121, 142) to fill water into the mixing chamber (172) to dilute the cleaning fluid or to the dosing device (173) to supply detergent into the mixing chamber (172) to increase the concentration of the cleaning fluid. The input water control means (121, 142) or dosing device (173) is kept open for supplying detergent by the controller until the sensors (174) outputs a predefined value/threshold. The refreshed cleaning fluid is then allowed to flow into the beverage line (200). When the desired pH value is output by the sensor (174), the controller sends a signal to close the input water control means (121, 142) or dosing device (173), but will open it again if the pH value output by sensor (174) deviates from the predefined value/threshold when the cleaning fluid is being delivered. The controller can control the opening/closing of said fluid control means (121, 142), pump means (180) and the dosing device (173) and can repeat the process until the pH is in an acceptable range.

In order to create forward-backward flow of cleaning fluid the bypass fluid control means (191) is/are opened while the fluid control means (151, 131, and 141) are closed to pull/suck the cleaning fluid flowing through the beverage lines back into the mixing chamber (172), and the bypass fluid control means (191) is/are closed while the fluid control means (151, 131, and 141) are opened for pumping the cleaning fluid forward into the beverage lines (200). The forward-backward motion is created by sequentially opening and closing bypass fluid control means (191) for a specified on and off cycle while at the same time sequentially closing and opening the fluid control means (151, 131, and 141) for the specified off and on cycle, for a period of time. The forward and backward motion within the beverage lines (200) provide effective cleaning of the inner surfaces of the beverage lines (200). In order to prevent the accumulation of dirty cleaning fluid in the mixing chamber (172), pushing duration of the cleaning fluid is configured to be longer than sucking duration of the cleaning fluid in the specified push-pull cycle. Thus, the bypass fluid control means (191) remain(s) opened less than that the fluid control means (151, 131, and 141) remain opened in the specified push-pull cycle. The controller can control the opening/closing of fluid control means (191, 151, 131, and 141) and pump means (180) and can repeat the process until a threshold value of pH, volume or duration is achieved for the flushing fluid.

Then, in order to operate the beverage line cleaning apparatus (100) in normal flow mode again, output fluid control means (151, 141) for cleaning phase or output fluid control means (151, 131) for rinsing phase are opened while the bypass fluid control means (191) is closed in order to flow the fluid into the beverage lines (200).

When the controller receives a signal from the sensors indicating that the pH value of the cleaning fluid is equal to the threshold value this is taken as indicating that the cleaning fluid has removed substantially all of the bacteria within the beverage line as the presence of bacteria may cause the pH value and concentration of cleaning fluid to deviate from its supply pH value. At this point the pump means is turned off through the sequence of the operating instructions of the controller or by the user pressing an appropriate button on the controller or by the dispensing tap or sensor (210) and/or valve (220) existing on the beverage dispensing system that is interconnected to the beverage line cleaning apparatus (100) and output fluid control means in the rinsing water conduit is opened by the controller to initiate the rinsing phase.

While the cleaning process of the present invention is described in an exemplary embodiment as being applied to the beverage lines to "clean" the various beverage carrying components of the beverage dispensing system, it is contemplated within the scope of the present invention that the beverage line cleaning apparatus and system may be employed to sanitize these components. To that end, the cleaning fluid dispensed by the detergent dosing and mixing unit should not be limited to cleaning products, such as detergents, soaps, etc., but these products may also include sanitizing agents.

The present invention also provides a networked system and environment for operating a beverage line cleaning apparatus as described herein. The networked system and environment include beverage line cleaning apparatus (100) described above and beverage dispensing system, which can be a beverage dispensing system including a smart tap described in WO 2018/236758 or another beverage dispensing system including a conventional dispensing tap. The networked system and environment may also include other devices or systems used at the venue of the beverage dispensing system such as POS systems. The network environment also includes gateway, network, remote server, and user devices.

The gateway can be a device installed in the beverage line cleaning apparatus, a module embedded in the controller of the beverage line cleaning apparatus or a device installed in the environment of the beverage line cleaning apparatus for example in the beverage dispensing system. In embodiments in which the disclosed beverage line cleaning apparatus includes wide area connectivity capabilities, for example by having a cellular modem, the gateway may be not be a separate device, but rather the functionality of the gateway can be distributed among various beverage line cleaning apparatus.

Gateway includes a local network connection module (e.g., Bluetooth or other wireless or wired local area connection) that enables the gateway to send data to and receive data from the beverage line cleaning apparatus in a local region surrounding the gateway (e.g. a bar, restaurant or another beverage venue). The local network connection module can also enable the gateway to send data to and receive data from user devices within the local region. For example, gateway can send sensed parameters to or receive configurations from an application running on the mobile device of a user such as a bartender within the local region. Gateway also includes a wide area network connection module (e.g. a cellular modem or wired Internet connection) that enables the gateway to communicate over the network with the remote server, and optionally with the user devices. Gateway can further include a data repository for storing historical beverage line cleaning data including a history of sensed parameters and the flow conditions of various beverage lines and dispensing taps that were used to dispense particular beverages. Thus, the gateway may also store historical beverage line cleaning data in an internal memory that can be recalled, for example, by USB connection, network connection (wired or wireless), cell phone connection, near field communication, Bluetooth connection, and the like. The historical beverage line cleaning data can also periodically be automatically be logged into the data repository of the remote server and/or sent to a user device via network.

The network can include any appropriate network, including an intranet, the Internet, a cellular network, a local area network or any other such network or combination thereof. User devices can include any network-equipped computing device, for example desktop computers, laptops, smartphones, tablets, e-readers, gaming consoles, and the like. Users can access the interactive system and view beverage line cleaning data via the network and can be provided with recommendations via the network.

The remote server includes one or more electronic hardware processors and one or more memories for storing computer-readable instructions and the described data. The memory can include data repository (e.g., a database), and the recommendations engine and reporting engine can be implemented by the processor(s) executing the computer-readable instructions to process data stored in the data repository. Remote server can be remote from some or all of the draft beer system, the beverage line cleaning apparatus, and user devices. Remote server can include multiple remote server devices in a distributed manner working in harmony such as to serve as a cloud service.

The data repository is configured to store sensed parameters (e.g., the amount/volume of washing/rinsing water and cleaning/flushing fluid, time, date and duration of the cleaning process, pH, conductivity, temperature, pressure, color, and the like) from the beverage line cleaning apparatus and/or dispensing taps if they are smart taps, and/or sensor (s) and valves configured to sense the parameters of the beverage flowing through the beverage lines if they are connected to the internet or another system, location, beer brand, user, beverage line cleaning quality standards including thresholds, and recommendations data including recommendations between related parties such as bar managers, bar owners, bartenders, technical service company personnel, beverage distributor company personnel, beverage line cleaning apparatus producer or designer personnel, reporting service provider personnel, beverage producer personnel such as breweries including draft beer manufacturer officers, or public health authorities (referred to herein as "related parties" or "users"). The beverage line cleaning quality standards may vary with respect to the type of the beverage dispensing system, the number of dispensing taps, type of beverage, service frequency, service volume, geography, temperature, pressure and other parameters and there is no global standard for beverage line cleaning. Thus, according to the present invention, the beverage line cleaning quality standards can be configurable by related parties and include a specified time and period for cleaning, specified amount/volume of washing/rinsing water and cleaning/flushing fluid, time, date and duration of the cleaning process, pH, conductivity, temperature, color, pressure and associated thresholds for cleaning beverage lines. The data repository can also store a centralized beverage line cleaning apparatus database in order to provide updates to the beverage line cleaning apparatus. For example, when a beverage line is not cleaned on time or the performed cleaning does not comply with the standards such data can be sent as a notification to user devices such as a smart phone of a user or the associated dispensing tap if the dispensing tap is a smart tap and it can be blocked from dispensing beverages if the beverage line is not cleaned on time or the cleaning does not comply with the cleaning quality standards. The centralized database can also store recently cleaned beverage lines of a bar and send data regarding these beverage lines to user devices such as a smart phone of a user or the associated dispensing tap if it is a smart tap. In case the associated dispensing tap is a smart tap, it can allow the dispensation of beverage through the beverage line when the beverage line is cleaned or the cleaning complies with the standards.

The recommendations engine can compare sensed parameters of cleaning process at various bars and other venues implementing the disclosed beverage line cleaning apparatus to for example bar-specified and/or brewery-specified beverage line cleaning standards. These comparisons can be used to identify for example beverage lines in a bar cleaned in compliance with the bar beverage line cleaning standards and to generate recommendations accordingly for presentation to bar managers or bar owners. These comparisons can also be used to identify bars that do or do not comply with brewery beverage line cleaning standards and to generate recommendations accordingly for presentation to breweries. This information is important for breweries to standardize their product service quality. The recommendations may also be generated for public authorities, where public health is a concern. The recommendations and recommendation standards can be a result of expert opinion, a predefined function of some gathered data, or an algorithm which may include artificial intelligence.

The reporting engine can handle the reporting of various alerts, data, and recommendations to users. Such reporting can be made via a mobile application and/or a web-based application to a user. These reporting can also be sent to the dispensing tap if it is configured to connect the server such as a smart tap.

The remote server can also include an analytics engine that analyzes aggregate subsets of sensed parameter data from the beverage line cleaning apparatus for example the amount of cleaning fluid, duration of cleaning) and beverage dispensing system including the beverage lines and dispensing taps (for example flow volume) or other devices or systems used at the venue of the beverage dispensing system such as POS systems through their software or hardware interfaces in order to identify cleaning performance of various beverage lines and bars, for example compared to other beverage brands, in different regions, and/or at different bars or types of bars. The analytics engine can also calculate the optimum beverage line cleaning quality standards according to the sensed parameter data. For example, the analytics engine can calculate optimum predefined values/thresholds for the amount of detergent and cleaning fluid and duration for cleaning a beverage line and the recommendation engine generates a recommendation including the optimum amount of detergent and cleaning fluid and duration for the cleaning process for sending this information to the beverage line cleaning apparatus (100) and/or for presenting this information to the users in order to standardize the cleaning quality and minimize the resource consumption.

The network environment can provide user interfaces that can be presented to related parties on a user device for example a user interface that presents cleaning status information for a number of different beverage lines at a bar and recommendations to the related parties regarding the cleaning process of a beverage line. The cleaning status information and the recommendations can be determined based on sensor data received from the beverage line cleaning apparatus and/or beverage dispensing systems including the beverage lines and dispensing taps. Another example may include an interface that can be presented to a bar owner or manager to see their cleaning reports, quality data representing bar or beverage line compliance with their beverage line cleaning quality standards in a daily, weekly, monthly, or other specified periods. The related parties can also be presented with an interface to track the performance of a cleaning process, for example the date, time and duration of the cleaning process, the amount of water and detergent used. Certain notifications may be provided in real time, for example sensor data that indicates a particular beverage line from the bar is suffering from insufficient cleaning, beneficially enabling the brewery to reach out to a bar. The related parties can also be alerted when the beverage line cleaning is not performed adequately, the detergent is insufficient for a proper cleaning, and/or pH, conductivity, color, temperature or pressure problems are detected with cleaning process. This can allow the related party to follow up with these issues with a maintenance team. Beneficially, the data and recommendations provided via the user interfaces can assist related parties in determining how to perform the right style of beverage line cleaning, simplify the maintenance and to know how a bar is doing compared to others.

Another user interface that the network environment can provide to related parties allows the related parties to specify the beverage line cleaning conditions for the beverage lines that satisfy their cleaning quality standards. In one example, the interface can allow the related party to specify the amount of washing/rinsing water and cleaning fluid. In other examples the interface can allow the related party to specify other cleaning conditions, for example duration, temperature, pH, color, conductivity. Another user interface can allow the related party to monitor bar compliance with these cleaning quality standards. Another user interface can provide recommendations to related parties based on comparison of received beverage line cleaning apparatus and/or beverage line cleaning system sensor data, where such recommendations positively recommend bars that are in compliance with their cleaning standards and negatively recommend bars that are out of compliance with the cleaning standards.

As used herein, "real time" can refer to sensing, processing, and system operations that occur while fulfilling a cleaning process. For example, cleaning fluid and/or parameters can be sensed when the beverage line cleaning apparatus performing cleaning process and the beverage line cleaning apparatus and/or dispensing tap can determine the cleaning conditions for cleaning process based on the sensed parameters and the control instructions. The parameters can be sensed periodically during use of the system, initially when the beverage line cleaning apparatus is activated, intermittently or continuously as the cleaning process being performed.

The invention claimed is:

1. A networked system for cleaning a plurality of beverage lines comprising:

a server including:

a data repository configured to store cleaning instructions associated with a beverage line of the plurality of beverage lines; and a module configured to connect the server to a network; and a plurality of beverage line cleaning apparatuses remote from the server and configured for cleaning the plurality of beverage lines, said plurality of the beverage line cleaning apparatuses comprising:

an input water conduit connectable to a mains water supply;

an output fluid conduit in fluid communication with said input water conduit wherein said output fluid conduit is configured to connect to at least one beverage line of the plurality of beverage lines in fluid communication;

at least one fluid controller configured to allow or prevent fluid flow from said input water conduit to said output fluid conduit;

at least one connector connecting the at least one beverage line to said output fluid conduit;

a pump configured to cause a flow of mains water through said input water conduit into said output fluid conduit;

at least one sensor configured to generate parameter data representing a parameter of fluid flowing through the input water conduit and output fluid conduit;

a controller configured to:

receive the cleaning instructions over the network; and during cleaning of the beverage line, control to open or close the fluid controller based on the received cleaning instructions, wherein said controller is configured to receive the parameter data from said at least one sensor and to control an opening or a closing of said fluid controller based on real time sensing of the parameter data based at least partially on the parameter data;

wherein said module is configured to transmit the stored cleaning instructions to a designated beverage line cleansing apparatus of said plurality of beverage line cleaning apparatuses, said plurality of beverage line cleaning apparatuses configured to clean the plurality of beverage lines, said plurality of beverage line cleaning apparatus being respectively positioned at different locations, each of said plurality of beverage line cleaning apparatuses having a network connectivity module configured to transmit the parameter data over a network, wherein a module of the server is configured to connect the server to the network in order to receive the parameter data from each of said plurality of beverage line cleaning apparatuses, wherein said data repository is configured to receive and store the parameter data from each of said plurality of beverage line cleaning apparatuses, said server further comprising:

an analytics engine configured to analyze subsets of the parameter data in order to identify optimum beverage line cleaning quality standards; and a recommendation engine configured to generate a recommendation or report based on an analysis of the analyzed subsets by said analytics engine and to cause an output of a user interface to a designated user of the recommendation or report.

2. The networked system of claim 1, wherein the cleaning instructions include a specified pH range, a specified conductivity range and/or a specified color range for the cleaning fluid.

3. The networked system of claim 1, further comprising:

a beverage dispensing tap adapted to dispense a beverage through the beverage line, said beverage dispensing tap comprising:

at least one sensor configured to generate parameter data representative of a flow of fluid through the beverage line; and at least one valve controlling the flow of fluid through the beverage line, the network connectivity module configured to transmit an instruction to a beverage dispensing tap or the at least one beverage line over the network in order to control an operation of said at least one valve.

4. The networked system of claim 1, wherein the server further comprises:

an analytics engine configured to analyze the parameter data to determine compliance with the beverage line cleaning quality standards; and a recommendation engine configured to generate a recommendation or report based on said analytics engine analyzing the parameter data, the recommendation or report representing whether the beverage line cleaning apparatus complies with the beverage line cleaning standards, and to cause an output of the recommendation to a related party.

5. The networked system of claim 1, wherein the beverage line cleaning quality standards are configurable by a user.

6. The networked system of claim 1, wherein the beverage line cleaning quality standards include a specified time and a period for cleaning.

7. The networked system of claim 1, wherein the beverage line cleaning quality standards include a specified volume of water or duration for a washing step, a specified volume of the cleaning fluid or duration for a cleaning step and a specified volume of water, a specified duration for a rinsing step wherein the at least one sensor comprises a flow meter configured to sense a volume of the flow of fluid through the output fluid conduit.

8. The networked system of claim 1, wherein the beverage line cleaning quality standards include a specified pH range, a specified conductivity range or a specified color range for the cleaning fluid, wherein the at least one sensor comprises a pH sensor, a conductivity sensor or a color sensor configured to sense a parameter of the cleaning fluid.

9. The networked system of claim 1, wherein the beverage line cleaning quality standards include a specified pH range, a specified conductivity range or a specified color range for a flushing fluid flowing through the beverage line in order to check if the cleaning process is performed properly, wherein the at least one sensor comprises a pH sensor, conductivity sensor or color sensor configured to sense a parameter of the flushing fluid.

10. The networked system of claim 1, further comprising a plurality of dispensing taps configured to dispense beverages and located at different venues, wherein at least one sensor is positioned within or on the plurality of dispensing taps and configured to generate a parameter data representing a parameter of beverage flowing therethrough and the data repository is configured to receive and store parameter data from each of plurality of dispensing taps.

11. The networked system of claim 1, wherein the beverage line cleaning quality standards include a specified pH range, a specified conductivity range or a specified color range for the cleaning fluid, wherein the at least one sensor comprises a pH sensor, a conductivity sensor or a color sensor configured to sense a parameter of the cleaning fluid.

12. The networked system of claim 1, wherein the beverage line cleaning quality standards include a specific service frequency or a specific amount or volume of beverage serviced through the dispensing tap, wherein the at least one sensor comprises a flow meter configured to sense the service frequency or the amount or volume of the beverage serviced through the dispensing tap.

13. The networked system of claim 1, wherein the at least one sensor comprises a flow meter, wherein the parameter data comprises the volume of the flow of fluid along the fluid transfer paths of the plurality of beverage line cleaning apparatus, wherein the analytics engine is configured to identify that the fluid has been flowed below or above a threshold volume or at volumes going beyond or exceeding a predetermined rate of change over a window of time.

14. The networked system of claim 1, wherein the at least one sensor comprises a pH sensor, conductivity sensor or color sensor wherein the parameter data comprises pH, conductivity or color of the flow of fluid along the fluid transfer paths of the plurality of beverage line cleaning apparatus and wherein the analytics engine is configured to identify that the fluid has been flowed below or above a specified pH range, a specified conductivity range or a specified color range.

15. The networked system of claim 1, wherein the at least one sensor comprises one or more of a flow meter, pH sensor, conductivity sensor or color sensor, wherein the parameter data comprises one or more of the amount of a detergent, the volume of cleaning fluid and the duration of a cleaning process and wherein the analytics engine is configured to identify that the amount of detergent used, the volume of cleaning fluid has been flowed and the duration of a cleaning process is within a specified range.

16. The networked system of claim 1, wherein the recommendation represents whether each of the different locations has complied with the beverage line cleaning standards.

17. The networked system of claim 1, wherein said beverage line cleaning apparatus comprises a detergent dosing and mixing unit configured to provide a predefined amount of a cleaning fluid into said output fluid conduit.

18. The networked system of claim 17, wherein the detergent dosing and mixing unit includes a controllable dosing device configured to provide a predefined amount of detergent to prepare the cleaning fluid and the controller is configured to, based at least partly on the cleaning instructions, determine to open or to close the dosing device.

19. The networked system of claim 17, wherein the detergent dosing and mixing unit comprises a mixing chamber and wherein said beverage line cleaning apparatus comprises at least one bypass fluid conduit configured to connect the output fluid conduit in fluid communication to the mixing chamber and having at least one bypass fluid controller configurable to either to allow fluid in the output fluid conduit to flow to the mixing chamber or prevent fluid in the output fluid conduit flowing to the mixing chamber.

20. The networked system of claim 19, wherein the pump is further configured to cause flow of at least a part of fluid directly from the output fluid conduit back into the mixing chamber.

21. The networked system of claim 20, wherein the controller is configured to, based at least partly on the parameter data, determine to sequentially open and close the bypass fluid controller while at the same time sequentially closing and opening the fluid controller for a specified on and off cycle in order to create an agitation in the beverage lines.

* * * * *